United States Patent
Namba et al.

(10) Patent No.: US 9,141,294 B2
(45) Date of Patent: Sep. 22, 2015

(54) CONTROLLER FOR STORAGE APPARATUS AND CONTROLLING METHOD FOR STORAGE APPARATUS

(75) Inventors: Yoshiki Namba, Kanagawa-ken (JP); Hiroyuki Nishikawa, Saitama-ken (JP); Taichi Tashiro, Tokyo (JP); Keiji Yamamoto, Tokyo (JP); Kohta Nakamura, Tokyo (JP)

(73) Assignee: Toshiba Corporation, Tokyo (JP)

( * ) Notice: Subject to any disclaimer, the term of this patent is extended or adjusted under 35 U.S.C. 154(b) by 148 days.

(21) Appl. No.: 13/567,925

(22) Filed: Aug. 6, 2012

(65) Prior Publication Data

US 2013/0067144 A1 Mar. 14, 2013

(30) Foreign Application Priority Data

Sep. 13, 2011 (JP) .................... P2011-199665
Jun. 8, 2012 (JP) .................... P2012-131351

(51) Int. Cl.
*G06F 12/00* (2006.01)
*G06F 3/06* (2006.01)

(52) U.S. Cl.
CPC .............. *G06F 3/0611* (2013.01); *G06F 3/065* (2013.01); *G06F 3/0656* (2013.01); *G06F 3/0688* (2013.01)

(58) Field of Classification Search
USPC ........................................................ 711/162
See application file for complete search history.

(56) References Cited

U.S. PATENT DOCUMENTS

| 8,069,301 B2 | 11/2011 | Fukutomi et al. |
| 2009/0055792 A1* | 2/2009 | Itagaki ............................ 716/13 |
| 2010/0100664 A1 | 4/2010 | Shimozono |

FOREIGN PATENT DOCUMENTS

| JP | 2006227923 A | 8/2006 |
| JP | 2010-015516 A | 1/2010 |
| JP | 2010-102369 A | 5/2010 |

OTHER PUBLICATIONS

Office Action issued in related Japanese Patent Application No. 2012-131351 mailed Aug. 25, 2013, 5 pages (with translation.).

* cited by examiner

*Primary Examiner* — Reginald Bragdon
*Assistant Examiner* — Hamdy S Ahmed
(74) *Attorney, Agent, or Firm* — Baker Botts L.L.P.

(57) ABSTRACT

According to one embodiment, a controller for a storage apparatus is disclosed having interfaces connectable to a host system, a first storage apparatus and a second storage apparatus. A data in the first storage apparatus and a data in the second storage apparatus are duplicates. A status table stores the operating state regarding the first storage apparatus and the second storage apparatus, wherein the operating state indicates among writing, reading, or standing by. A monitor monitors the interfaces and set up the operating state into the status table. A buffer memory buffers the data for writing in the first storage apparatus and the second storage apparatus. A command response unit receives the data for writing and write-in request from a host system, and directs the writing of the data to the first storage apparatus and the second storage apparatus while making the buffer memory buffer the received data.

17 Claims, 9 Drawing Sheets

Dummy data management table

|  | Dummy data size | Specified by host system | | After addition dummy data | |
|---|---|---|---|---|---|
| SSD3 | 0K | LBA(H) | Size | LBA(C) | Size |
| SSD4 | 10K | LBA(H) | Size | LBA(C) | Size |

44 Parity data management table

|  | Specified by host system | | After addition parity data | |
|---|---|---|---|---|
| SSD3a | LBA(H) | Size | LBA(C) | Size |
| SSD3b | LBA(H) | Size | LBA(C) | Size |
| SSD4a | LBA(H) | Size | LBA(C) | Size |
| SSD4b | LBA(H) | Size | LBA(C) | Size |

*FIG. 10*

CONTROLLER FOR STORAGE APPARATUS AND CONTROLLING METHOD FOR STORAGE APPARATUS

CROSS-REFERENCE TO RELATED APPLICATIONS

This application is based upon and claims the benefit of priority from prior Japanese Patent Application No. 2011-1999665, filed Sep. 13, 2011, and prior Japanese Patent Application No. 2012-131351, filed Jun. 8, 2012, the entire contents of which are incorporated herein by reference.

FIELD

Embodiments described herein relate generally to a controller for storage apparatus and controlling method for storage apparatus.

BACKGROUND

Storage apparatus, such as a mass hard disk drive, are used for the apparatus for industrial ways which perform real-time distribution in the video contents memorized by the video server and the like.

This kind of apparatus needs to complete writing and read-out of data to a storage apparatus to within a time which is defined according to a system. That the time which the writing of data takes, and the time which read-out of data takes exceed the set time may cause interruption of video and audio.

Although hard disk drives are large capacity and low cost, they have difficulty in respect of speed and reliability. Therefore, a solid-state disk ("SSD" is called hereafter) has come to be used by the system of an industrial way as a high-speed storage apparatus in recent years.

The SSD used by the system of an industrial way is expensive if capacity becomes large. For this reason, to use general-purpose SSD at a low price connectable with the general-purpose interface of serial ATA and the like is required.

Since the delay time of writing and read-out are not guaranteed to storage apparatus, such as general-purpose SSD, delay may produce information processing apparatus in data processing. For this reason, storage apparatus, such as general-purpose SSD, cannot be used for the apparatus which performs real-time control with that state.

In recent years, the technology of guaranteeing the response time about the writing to the disk in a storage apparatus is developed by performing mirroring using two I/O buffers and two disks (for example, JP patent disclosure No. 2016-227923). By the way, since the same data as two disks will be written-in the case of such technology, when two disks approach a life at the same time, it is necessary to exchange both of disks at the same time. As a result, the period which cannot use a storage apparatus arises.

BRIEF DESCRIPTION OF THE VIEWS OF THE DRAWING

FIG. 10 is a figure showing an example of the parity data management table in the control device of the fourth embodiment.

DETAILED DESCRIPTION

In general and according to one embodiment, a controller for storage apparatus having interfaces connectable to a host system, a first storage apparatus and a second storage apparatus. A data in the first storage apparatus and a data in the second storage apparatus are duplicates. A status table stores the operating state regarding the first storage apparatus and the second storage apparatus, wherein the operating state indicates among writing, reading, or standing by. A monitor monitors the interfaces and set up the operating state into the status table. A buffer memory buffers the data for writing in the first storage apparatus and the second storage apparatus. A command response unit receives the data for writing and write-in request from a host system, and directs the writing of the data to the first storage apparatus and the second storage apparatus while making the buffer memory buffer the received data. A data processor sends the data buffered in the buffer memory to the storage apparatus which can be written with reference to the status table according to the direction of writing from the command response unit. A data addition unit is arranged between the data processor and either interfaces connected to the first storage apparatus or the second storage apparatus, add dummy data to the data for sending to the storage apparatus, and write-in the data added dummy data to the storage apparatus.

First Embodiment

Figure 1:
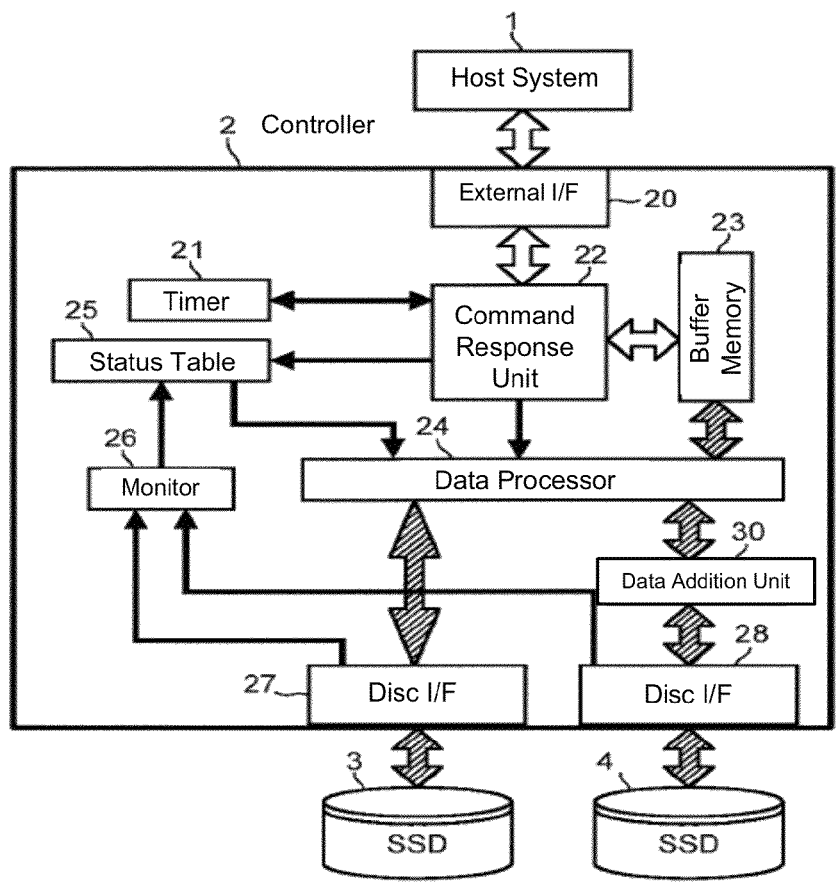
FIG. 1 is a figure showing the configuration of the control device of the first embodiment.
Figure 2:
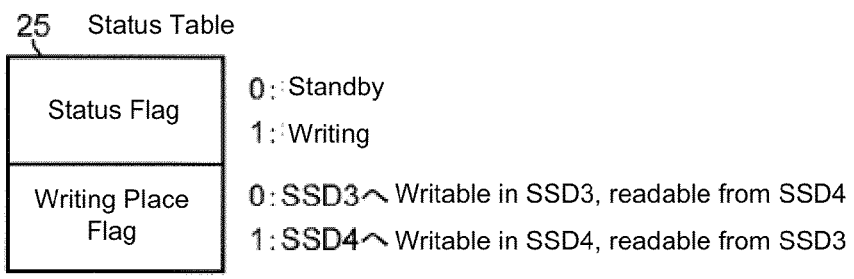
FIG. 2 is a figure showing the contents of the status table in the control device of the first embodiment.

Hereafter, embodiment is described in detail with reference to drawings. FIG. 1 is a figure showing the configuration of the controller 2 which functions as a delay guarantee apparatus.

As shown in FIG. 1, the controller 2 of the first embodiment, has a external interface 20 (the following "external I/F20" is called) to which a host system 1 is connected, a timer 21, a command response unit 22, a buffer memory 23, a data processor 24, a status table 25, a monitor 26, a disk interfaces 27 and 28 (the following "disk I/F 27, 28" is called), a data addition unit 30 arranged between the data processor 24 and one of disk I/F (this example disk I/F28).

The host system 1 is an apparatus which requires the guarantee of response time (time after a host system transmits a command until a host system receives the response) in read-out of the data from the storage apparatus and writing in the storage apparatus. The host system 1 is a system for industrial ways, such as a video server, a multimedia system, an information processing system, and a manufacture plant system, for example.

The disk I/F 27 and 28 are the interfaces for communicating with an external storage apparatus, for example, are serial ATA (SATA-2.6 or 3.0) and a port of PCI-e. In this embodiment, general-purpose SSD 3, 4 are connected to disk I/F 27 and 28 at a time as an external storage apparatus, respectively.

The external I/F 20 is an interface for communicating with the host system 1, for example, are serial ATA (SATA-2.6 or 3.0) and a port of PCI-e.

The timer 21 will send the notice of Time is up to the command response unit 22, if the time which started timer operation with the directions from the command response unit 22, and was counted reaches at the Time is up time set up in advance.

In addition, the host system 1 needs to complete the writing of data, and read-out of data within the acceptable response time in which it was provided with system specification. Here, response time means time after the host system 1 transmits a command until the response comes on the contrary. The acceptable response time means the greatest permissible response time. From acceptable response time, the time which deducted the transfer time (definite period of time decided by interface specification) of the command between the host system 1 and the command response unit 22 by setting up as Time is up time, the control device 2 controls the delay time of the external storage apparatus from the point of view of the host device 1 to within a fixed time.

The time which should return a response differs according to the use of a system to the host system 1. This time is 1 to 10 ms (millisecond) in case of the data logger used at a manufacture plant, this time is 33 ms in case of the system treating video, for example.

Time is up time is the maximum time of the processing delay permitted by the system by which a host system belongs, when returning a response to the host system 1. The time is up time is set as the timer 21 in advance. In addition, Time is up time may be written in the memory which can refer to the timer 21 from the outside.

That is, if the timer 21 counts time with directions of the count start from the command response unit 22 and counts it till Time is up time, it will send the notice of Time is up to the command response unit 22.

The command response unit 22 performs a command, a response, and an exchange of data between the host systems 1. The command response unit 22 sends the control signal which directs the writing of data, or read-out of data to the data processor 24 according to the command received from the host system 1.

Moreover, the command response unit 22 sends the control signal which directs a count start to the timer 21, if the write-in command which requires the writing of data from the host system 1 is received.

Moreover, when the command response unit 22 received the write-in command from host system 1, the command response unit 22 checks the operating state (standby or writing) of the SSD 3, 4 with reference to the status table 25, selects the SSD of the writing place of data according to an operating state, sets the writing place of data as the status table 25, and outputs the control signal which directs the writing to SSD (SSD 3 or SSD 4) for writing. Moreover, the command response unit 22 buffers the data for writing sent from the host system 1 one by one within fixed unit time after the write-in command to the buffer memory 23. In addition, in selection of the SSD of a writing place, if the operating state of SSD 3, is "standing by", the command response unit 22 changes a SSD operating state flag "during writing", and changes a writing place into other SSD(s).

On the other hand, if the command response unit 22 receives the notice of Time is up from the timer 21, when it be notified, the command response unit 22 returns the write-in completion response to a write-in command to the host system 1. That is, the command response unit 22 does not immediately return a write-in completion response, even if buffering of the data to the buffer memory 23 is completed, but waits for the Time is up time which is the response time of a system, and returns a write-in completion response. It is secured as delay guarantee time when delay of the data writing of time after completing reception of data until it reaches at Time is up time by the SSD 3, 4 arises by this.

The buffer memory 23 is configured to buffer the data temporarily. The buffer memory 23 buffers the write-in data received from the host system 1 temporarily.

If the control signal which directs the writing from the command response unit 22 is received, the data processor 24, the data processor 24 selects the SSD (either of SSDs 3, 4) which can be written in with reference to the status table 25, and the data processor 24 transmits the data read from the buffer memory 23 to selected SSD to disk I/F (disk I/F 27 or disk I/F 28) connected in the SSD concerned.

The data addition unit 30 sends to the SSD 4 the data which added the dummy data of fixed size to the data from the data processor 24, and added dummy data through disk I/F 28.

Moreover, the data addition unit 30 outputs the data which removed dummy data from the data read from the SSD 4 based on the read-out command of the data from the host system 1 and in which dummy data was removed to the data processor 24.

The operating state of SSD 3, 4 connected to the disk I/F 27, 28 and the SSD of a writing place are set to the status table 25. The operating state of SSD 3, 4 is indicated using a state flag. A writing place is indicated using a writing place flag.

The monitor 26 monitors the command of disk I/F 27, 28, or input and output of data. That is, the monitor 26 monitors the SSD 3, 4 through disk I/F 27, 28, and sets the operating state of the SSD 3, 4 as the status table 25 as a monitoring result.

Concretely, the monitor 26 sets the SSD 3, 4 of the operating state as a monitoring result, to the status table 25 using the state flag which indicates either standby or writing. That is, the monitor 26 changes an operating state flag from writing to standby, if a receivable response is received from the SSD 3, 4.

The operating state flag which indicates the operating state of the SSD 3, 4 is "0" or "1", for example. "0" indicates under standby (the state where writing is performed to neither of the SSDs), and "1" indicates under writing (while writing data in one of SSD 3, 4).

Moreover, the writing place flag which indicates a writing place is "0" or "1", for example. "0" indicates that the writing place of data is the SSD 3 and data's read-out origin is the SSD 4. "1" indicates that the writing place of data is the SSD 4 and data's read-out origin is the SSD 3. For example, a writing place flag "0" means write-in permission of the data of the SSD 3, and the read-out permission to the SSD 4.

The data processor 24 writes the data directed by the control signal which directs the writing from the command response unit 22 with reference to the status table 25 in the SSD (either the SSD 3 or the SSD 4) which can be written in. Moreover, the data processor 24 reads the data directed with the control signal which directs read-out from the command response unit 22 with reference to the status table 25 from the SSD (either the SSD 3 or the SSD 4) which can be read.

The data processor 24 duplicates data to a plurality of the SSD 3, 4 which were connected to disk I/F 27, 28. After the data processor 24 writes in SSD 3 the buffered data to the buffer memory 23, by reading the same data as having written in the SSD 3 from the buffer memory 23, and writing in the SSD 4, data synchronization is performed to a plurality of SSD 3, 4.

Figure 3:
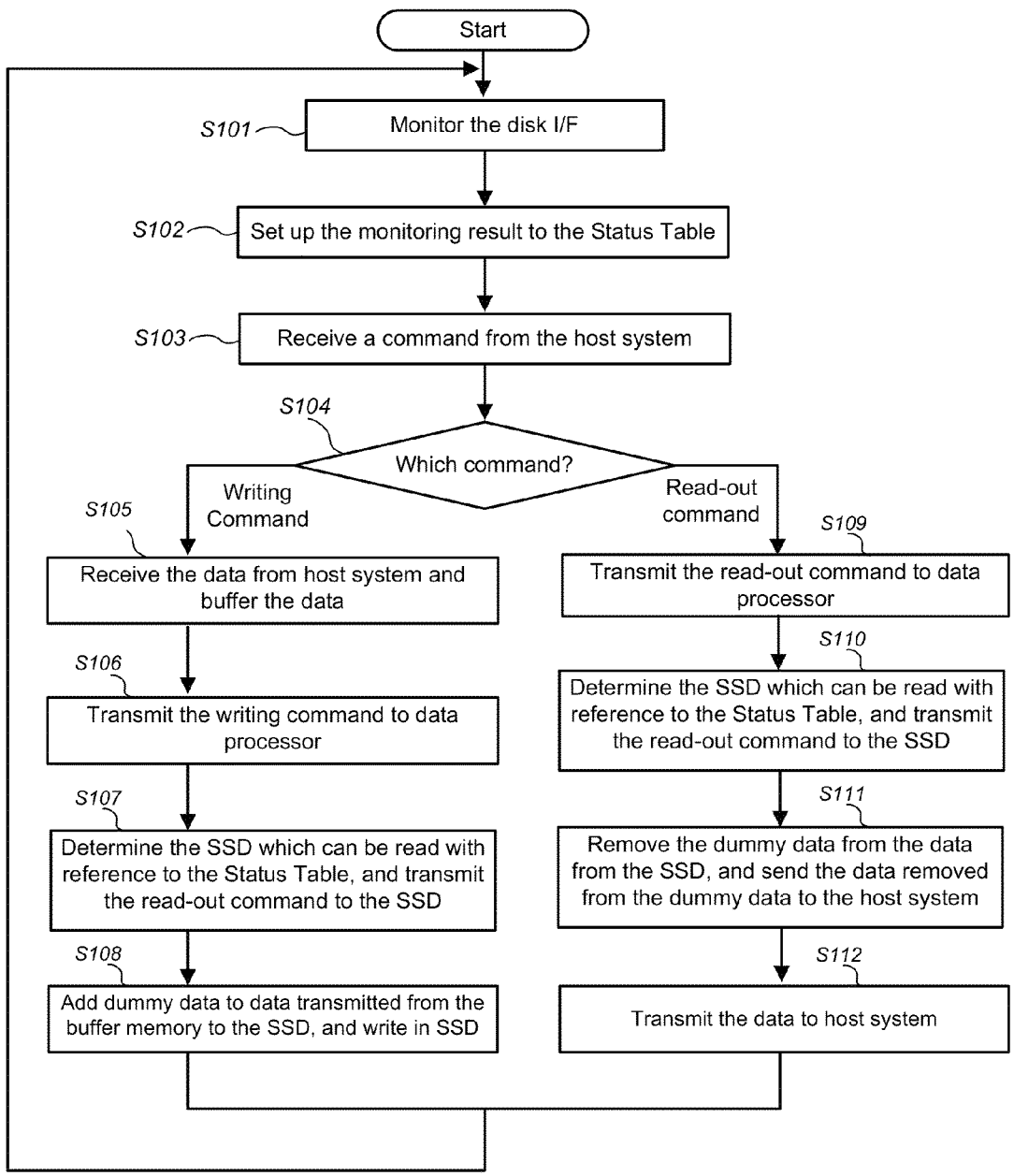
FIG. 3 is a flow chart showing operation of the control device of the first embodiment.

Then, with reference to the flow chart of FIG. 3, operation of the controller 2 for the storage apparatus of this first embodiment is explained. Writing and read-out of fixed cycle and fixed data size are always required from the controller 2 from the host system 1. This controller 2 maintains the SSD which is always one side between two sets of the SSDs 3, 4 at the state which can be read, in order to offer a delay guarantee to the host system 1.

For the purpose, two SSDs 3, 4 need to store the same data. For this reason, the command response unit 22 answers corresponding to the write-in command or read-out command from the host system 1, while switching the SSDs 3, 4 of a writing place and a read-out place.

In the case of this controller 2, the monitor 26 monitors input and output of the command or data sent to the disk I/F 27, 28 (Step S101 of FIG. 3). The monitor 26 sets the operating state and writing place of the SSD 3, 4 to the status table 25 according to a monitoring result (Step S102).

(Data Write-In Operation)

When the external host system 1 writes data in the SSD (the SSD 3 or the SSD 4), the host system 1 transmits the write-in command of data to the command response unit 22.

If the command response unit 22 receives the write-in command transmitted from the host system 1 (Step S103), the command response unit 22 determines if the received command is write-in command or read-out command (Step S103). If it is a write-in command, the command response unit 22 confirm that the SSDs (both the SSD 3, 4) is standing by with reference to the status table 25 while sending the control signal which directs a count start to the timer 21. When SSD is standing by, the command response unit 22 changes the writing place flag of the status table 25 by sending the control signal which directs change of a writing place to the status table 25.

For example, in case that writing place flag is "0" and state flag is "0" indicating standing by, if the command response unit 22 received the write-in command, the command response unit 22 changes a writing place flag into "1". That is, the command response unit 22 sets a writing place flag as write-in permission (write-protected to the SSD b3) of the SSD 4.

The timer 21 starts a count in response to the control signal of a count start.

Moreover, the command response unit 22 returns a receivable response to the host system 1. If this receivable reply command is received, the host system 1 is sends written in data one by one.

While the command response unit 22 buffers the data received from the host system 1 to the buffer memory 23 one by one (Step S105), the command response unit 22 sends the control signal which directs writing to the data processor 24 (Step S106). The control signal which directs writing includes the write-in command received from the host system 1.

The data processor 24 chooses the SSD which can be written in with reference to the status table 25, if the control signal which indicates the writing from the command response unit 22 is received. For example, the data processor 24 determines a writing place as the SSD 4 based on the writing place flag of the status table 25, and transmits a write-in command to disk I/F 28 to which the SSD 4 is connected. The SSD 4 which received the write-in command returns a receivable response. If this receivable response is received by the data processor 24 through the disk I/F 28, the data processor 24 reads fixed-length data from the buffer memory 23 one by one, and transmit to the disk I/F 28 to which the SSD 4 is connected (Step S107). In addition, the monitor 26 changes the state flag of the status table 25 into "1" indicating writing from "0" indicating standby, if a receivable response is received.

Then, the data addition unit 30 prepared between the data processor 24 and the disk I/F 28 adds the fixed-length dummy data to the received data and writes in the data added the dummy data through the disk I/F 28 to the SSD 4 of writing place (Step S108).

On the other hand, the timer 21 sends the notice of Time is up to the command response unit 22, if Time is up time (acceptable response time) passes after starting a count.

The command response unit 22 does not return a write-in completion response, even if all the data for one time is buffered into the buffer memory 23, but the command response unit 22 waits for reception of the notice of Time is up from the timer 21. It is the time for a delay guarantee of this time that is standing by.

And the command response unit 22 transmits a write-in completion response to the host system 1, if the notice of Time is up is received.

Moreover, the SSD 4 returns a write-in completion response, if the writing of data is completed. This write-in completion response is received by the monitor 26 and the data processor 24 through the disk I/F 28.

The monitor 26 changes the state flag of the status table 25 into "0" indicating standby from "1" indicating writing, if a write-in completion response is received.

The host system 1 transmits the write-in command of the following data, if a write-in completion response is received from the command response unit 22. The command response unit 22 changes the writing place flag of the status table 25 into "0" indicating the write-in permission to the SSD 3 from "1" indicating the write-in permission to the SSD 4, if the command is received.

The data processor 24 checks the writing place flag of the status table 25 if a write-in completion response is received from the SSD 4. In this example, since the writing place flag is "0" indicating the write-in permission to the SSD 3, the write-in command of data is transmitted to the SSD 3 for data synchronization.

The monitor 26 changes the state flag of the status table 25 into "1" indicating writing, if a write-in command is received.

The SSD 3 which received this write-in command returns a receivable response. If this receivable response is received by the data processor 24 through the disk I/F 27 and the monitor 26, the data processor 24 reads the buffering data in the buffer memory 23 one by one, and writes the data in the SSD 3 of a writing place through the disk I/F 27. In addition, the monitor 26 changes the state flag of the status table 25 into "1" indicating writing from "0" indicating standby, if a receivable response is received.

The SSD 3 returns a write-in completion response, if the writing of data is completed. This write-in completion response is received by the monitor 26 and the data processor 24 through the disk I/F 27.

The monitor 26 changes the state flag of the status table 25 into "0" indicating standby from "1" indicating writing, if a write-in completion command is received.

(Data Read-Out Operation)

When the host system 1 reads data from a storage apparatus, the host system 1 transmits the read-out command of data to the command response unit 22.

If the read-out command transmitted from the host system 1 is received (Step S103), the command response unit 22 determines if the received command is the write-in command or read-out command (Step S104), if it is a read-out command, the command response unit 22 sends the control signal which directs read-out for data to the data processor 24 (Step S109). The control signal which directs read-out of data contains the read-out command from the host system 1.

If the control signal which directs the read-out start from the command response unit 22 is received, The data processor 24 checks the SSD to which read-out permission is set with reference to the status table 25, and transmits a read-out start command to the SSD (the SSD 3 or the SSD 4) of read-out permission through the disk I/F 27 or the disk I/F 28 (Step S110).

Here, as a result of referring to the status table 25, a writing place flag assumes that the flag is set to "0" indicating the write-in permission to the SSD 3, in other words, the flag indicates the read-out permission from the SSD 4.

In this case, the data processor 24 transmits a read-out command to the SSD 4 through the monitor 26 and the disk I/F 28.

The SSD 4 which received the read-out command reads the data one by one, and sends the data to the disk I/F 28.

The data addition unit removes the dummy data from the data from the SSD 4, and sends the data removed the dummy data to the data processor 24, if the data from the SSD 4 is received (Step S110).

The data processor 24 sends the received data to the host system 1 (Step S111). In this case, the data received from the SSD 4 does not go via the buffer memory 23.

The SSD 4 sends a read-out completion response to the command response unit 22 through the disk I/F 28, the monitor 26 and the data processor 24, if transmission of data is completed. The command response unit 22 transmits a read-out completion response to the host system 1.

Thus, according to this first embodiment, data synchronization (data redundant or data duplicating) is realized using two sets of the SSDs 3, 4. Moreover, data is written in one SSD under standby, SSD of another side is write-protected, and data is read from the SSD of this another side. Thereby, it makes it possible to make a storage apparatus correspond to read-out of the data in real-time control.

When delay is guaranteed by performing data synchronization (data redundant or data duplicating) using two or more SSDs, since the SSD reaches the limit value of the number of times of writing of data earlier compared with SSD in which dummy data is not written, writing dummy data in one SSD makes uneven data size written in each SSD. Thereby, it makes it possible to make the life of every SSD 3 and 4 uneven.

In addition, the command response unit 22 or the data processor 24 counts the number of times of writing or the number of dummy data of this dummy data, when a predetermined count number is exceeded, the alarm lamp is indicated by lighting, alarm sound is outputted from a speaker although not illustrated. This makes it possible to alert an operator to exchange of the SSD which reached the life.

As a result, two or more SSDs can be prevented from reaching a life almost simultaneous, and the data stored in the SSD can be protected by exchanging the SSD for the order which reached the life.

As opposed to the write-in request of the data from the host system 1, The controller 1 buffers the data from the host system 1 to the buffer memory 23, and it writes data in the SSD 3, 4 from the buffer memory 23 while changing the state between the write-in state and the state of read-out of the SSD 3, 4. Thereby, the controller 1 makes it possible to absorb the delay generated in the SSD 3, 4. That is, the controller 2 is separating the processing to SSD 3, 4, and the processing to the host system 1, and enables response delay of SSD 3, 4 not to influence the host system 1. Therefore, delay of the SSDs in point of view of the host system can be made into predetermined response permission time.

Moreover, when writing in the data from the host system 1 is completed, without returning a write-in completion response immediately, even if buffering the data sent from the host system 1 to the buffer memory 23, the host system 1 returns the write-in completion response of data to the host system 1 according to the cycle which sends data. Since receiving data does not stay on the buffer memory 23 by this even when delay occurs in the writing of data in the SSD 3, 4, the influence of delay is absorbed. Thereby, general-purpose SSD 3, 4 to which delay time is not guaranteed can be used for real-time control.

Moreover, according to the controller 2 for the storage apparatus of this embodiment, the following effects are acquired.

1) By connecting a general-purpose storage apparatus (SSD and HDD) to the controller 2, it is no longer influenced by the delay generated to a storage apparatus in the case of the writing of data, and read-out of data.

2) The function of the disk I/F 27, 28 of the controller 2 is only changed, and it can respond to all the storage apparatus standardized the present and with future. That is, change to a new generation's storage apparatus can be performed easily.

3) The controller 2 can be made into expanded function, such as a computer and a server, and can be easily built also into the industrial apparatus of an indent article.

Next, the second embodiment is described with reference to FIG. 4 and FIG. 5. This 2nd embodiment is a modification of the first embodiment, the same mark is given to the same configuration as the first embodiment, and that same explanation is omitted.

Figure 4:
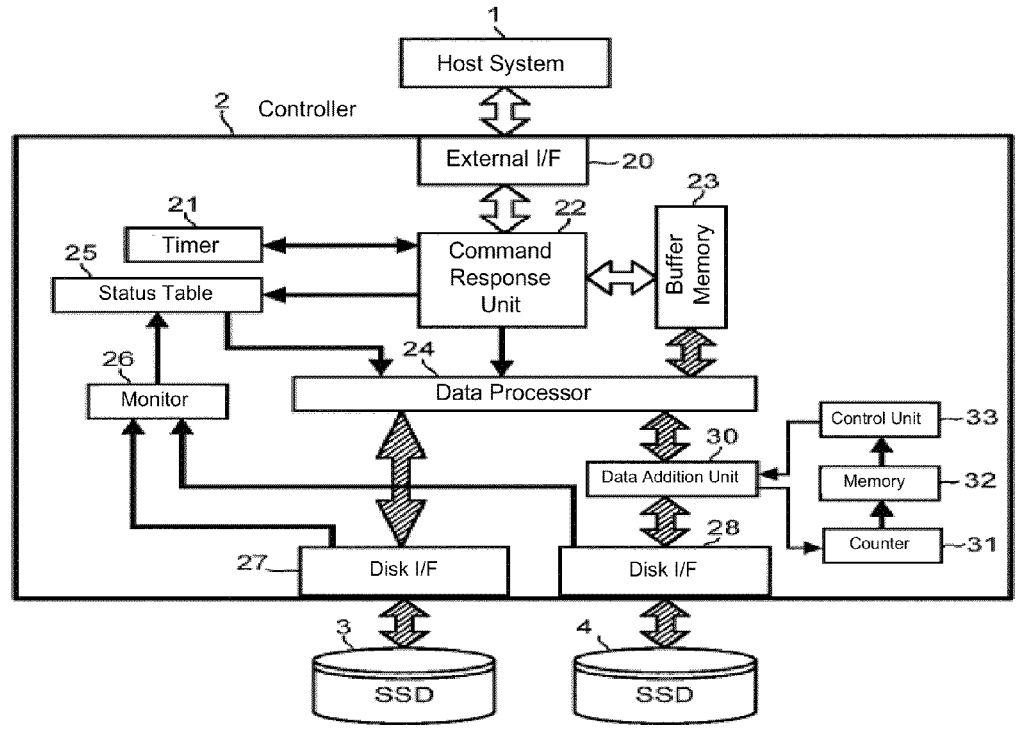
FIG. 4 is a figure showing the configuration of the control device of the second embodiment.

A shown in FIG. 4, the controller 2 of the second embodiment has a counter 31, memory 32, and control unit 33 in order to control the data addition unit 30.

The counter 31 counts the data volume of the dummy data added to the data sent from the data processor 24 by the data addition unit 30, and stores the counted data volume in the memory 32.

As for the memory 32, non-volatility memories, such as a flash memory, are used, for example. This memory 32 stores the data volume of the dummy data counted by the counter 31.

The control unit 33 sends the control signal for stopping addition of dummy data to the data addition unit 30, when the total data volume of the dummy data counted by the counter stored at the memory 32 reaches the threshold value set up in advance.

In the case of this second embodiment, the operation for a delay guarantee is the same as the first embodiment, but the operation in the case of writing data in the SSD 4 differs from the operation in the case of reading data from the SSD 4. Here, the operation in the case of writing data in the SSD 4 and the operation in the case of reading data from the SSD 4 are explained.

If the data from the data processor 24 is received when writing data in SSD 4, the data addition unit 30 adds the dummy data of certain size to the received data, and sends it to the SSD 4.

Figure 5:
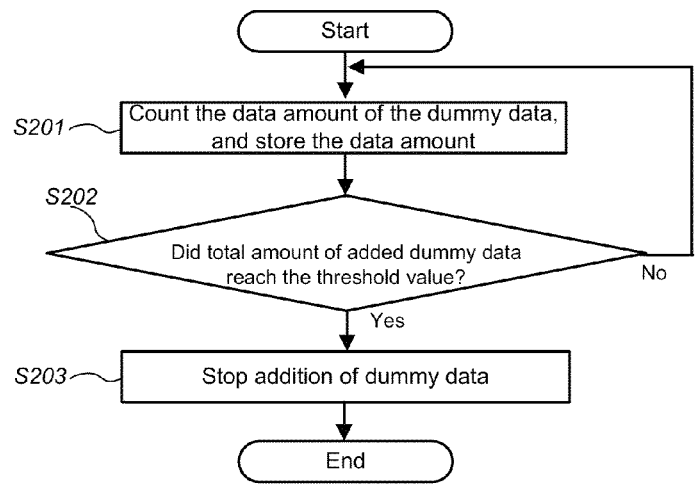
FIG. 5 is a flow chart showing operation of the control device of the second embodiment.

As shown in FIG. 5, the counter 31 counts the data volume of the dummy data added by the data addition unit 30 (Step S201), and stores it in the memory 32.

Whenever the data volume of the dummy data stored at the memory 32 is updated, the control unit 33 measures the amount of dummy data currently stored at the memory 32 with the threshold value set as the memory 32 in advance (Step S202), when the total data volume of the added dummy data reaches a threshold value (Yes of Step S202), the control unit 33 sends the control signal for stopping addition of dummy data to the data addition unit 30 (Step S203).

In other words, dummy data write-in upper limit is set to 1 GByte as a threshold value of the SSD 4, for example, and the control unit 33 stops adding dummy data, when a total value exceeds the threshold value of 1 GByte, comparing total dummy data with a threshold value.

Thereby, the dummy data more than a threshold value is no longer added to one the SSD 4, and it can prevent only the SSD 4 of one of the two reaching a life early extremely.

Thus, according to this second embodiment, only one SSD 4 can be prevented from reaching a life early extremely, though the data size written in each SSD 3, 4 becomes uneven and makes the life of the SSD 3, 4 uneven.

Figure 8:
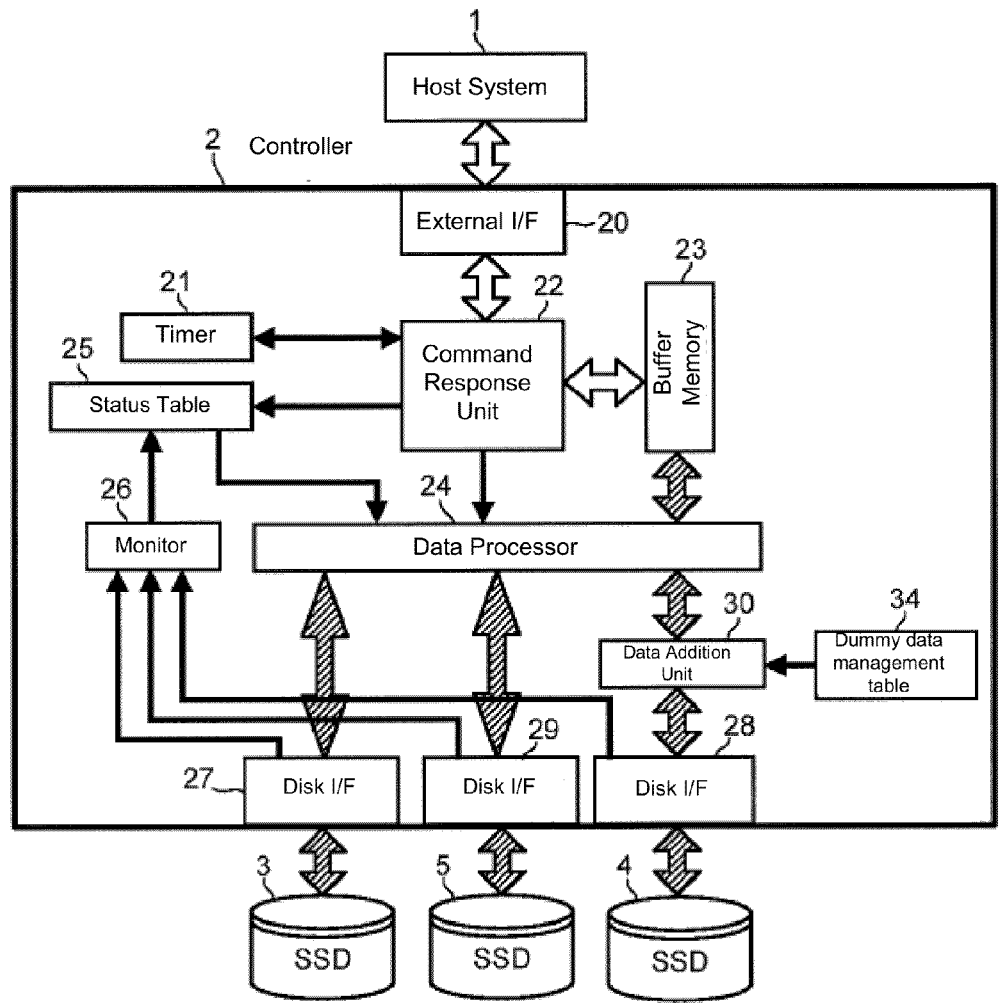
FIG. 8 is a figure showing the example of a configuration to which the parallel number of SSD extended the third embodiment to a three-set configuration.

Next, the third embodiment is described with reference to FIG. 6, FIG. 7, and FIG. 8. This 3rd embodiment is a modification of the first embodiment, the same mark is given to the same configuration as the first embodiment, and that same explanation is omitted.

Figures 6, 7:
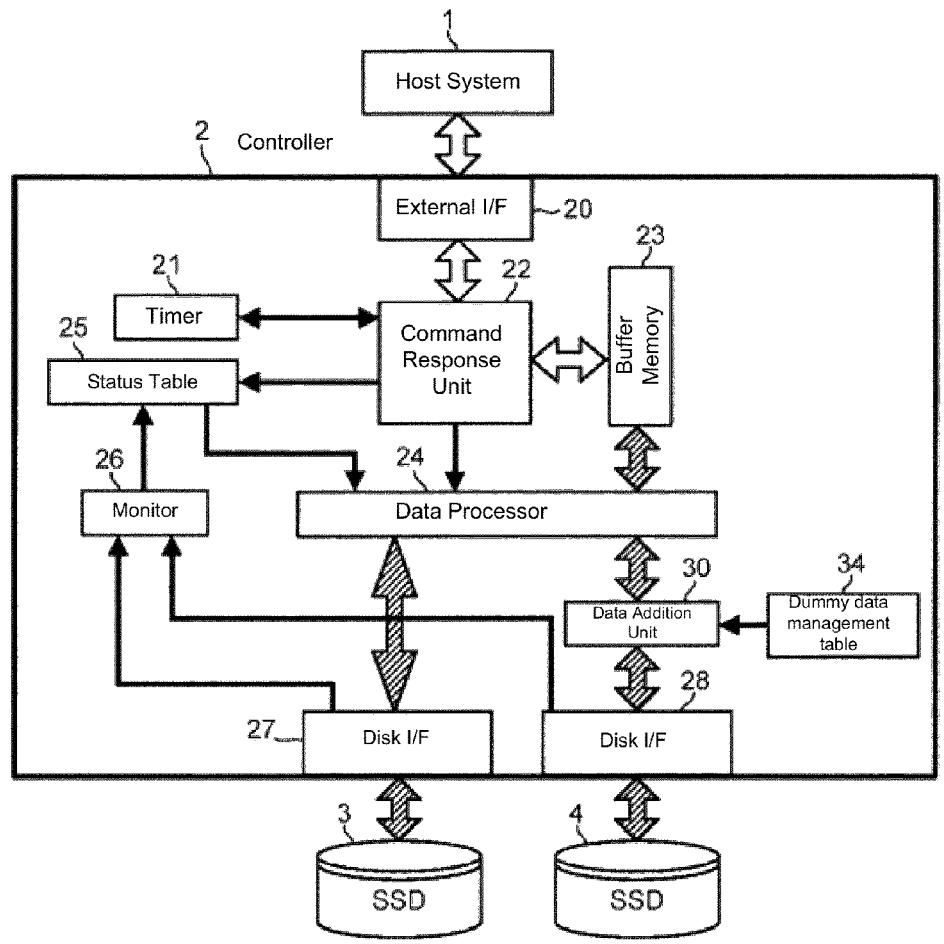
FIG. 6 is a figure showing the configuration of the control device of the third embodiment.
FIG. 7 is a figure showing the contents of the dummy data management table in the control device of the third embodiment.

As shown in FIG. 6, the controller 2 of the third embodiment has the data addition unit 30 and a dummy data management table 34. The data addition unit 30 is arranged among at least one the disk I/F 27, 28 by which a plurality of the SSD 3, 4 are connected with the data processor 24.

That is, the data addition unit 30 may be arranged both the disk I/F 27 and the disk I/F 28, respectively, and the data addition unit 30 may be connected to either one of the disk I/F 27 or the disk I/F 28.

As shown in FIG. 7, the size of dummy data added to the data written in every the SSDs 3, 4 is stored at the dummy data management table 34. For example, it is assumed that the data addition unit 30 adds a dummy only to the SSD 4 without adding dummy data to the SSD 3. In that case, the data addition unit 30 does not add dummy data to the data written in the SSD 3 among the data transmitted from the host system 1. The data addition unit 30 is set up to add a quantity different for every write-in time such as 10 K bytes of dummy data, 5 K bytes of dummy data, and 2 K bytes of dummy data to the 1st time, the 2nd time, and the 3rd write-in data written in the SSD 4, respectively. In this case, if the total amount of dummy data to add is held down to less than the fixed amount of dummy data written in by the first embodiment, more data other than dummy data can be written-in to disk storage capacity. Moreover, when recording variable-length data, the data addition unit 30 may be configured that the amount of dummy data each time which is added to the variable-length data is changed according to the variable-length data.

Moreover, this dummy data management table 34 stored the logical address (LBA (H)) which indicates the write-in position for every SSD and the size of the writing data, as information specified from the host system 1, the logical address (LBA (C)) which indicates the write-in position for every SSD and the size of the writing data, as information after dummy data addition, and the data to write in is registered by the data addition unit 30.

Here, "the logical address (LBA (C)) after dummy data addition" is an address changed into the logical address after adding the size of the dummy data set as the data addition unit 30 in advance in the logical address (LBA (H)) specified by the host system 1. Moreover, "the size after dummy data addition" is the value with which "the size of the dummy data set as the data addition unit 30 in advance" was added to the data size specified by the host system 1.

In the first embodiment of the above, the data sent from the host system 1 was fixed size and a fixed interval. However, in the case of this third embodiment, the information on the data sent from the host system 1 and the information after dummy data addition are registered and managed on the dummy data management table 34. Therefore, the data size of the data sent from the host system 1 may be variable length. Moreover, SSD is not restricted to two sets. As shown in FIG. 8, the configuration of having connected three sets of SSD 3, 4, and 5 in parallel may be used. That is, a parallel number can apply to three or more sets also of things.

In the case of this third embodiment, the data processor 24 sends the data currently stored in a plurality of the SSD 3, 4 at the buffer memory 23 to the SSD 3 or the SSD 4 which can write in data with reference to the status table 25 based on the write-in control signal from the command response unit 22.

The data addition unit 30 is written-in with reference to the dummy data management table 34, and writes the data which added the dummy data of the size corresponding to the target SSD 3, 4 to the data to SSD 3, 4 and in which dummy data was added in SSD 3, 4. The dummy data which adds the example of the dummy data management table of FIG. 7 to the data written in the SSD 3 is 0 K byte, and dummy data is not added to the SSD 3 like the first embodiment.

According to this third embodiment, by having the dummy data table 34 for managing the dummy data added for every SSD, size of the dummy data added to write-in data and the information (a logical address and size) for deleting dummy data from the data read from the SSD can be registered in two or more sets of SSD 3, 4—That is, the controller 2 with higher flexibility can be offered.

Next, the fourth embodiment is described with reference to FIG. 9 through FIG. 12. This fourth embodiment is a modification of the third embodiment, the same mark is given to the same configuration as the third embodiment, and that same explanation is omitted. As for this fourth embodiment, parity data is used instead of dummy data.

Figure 9:
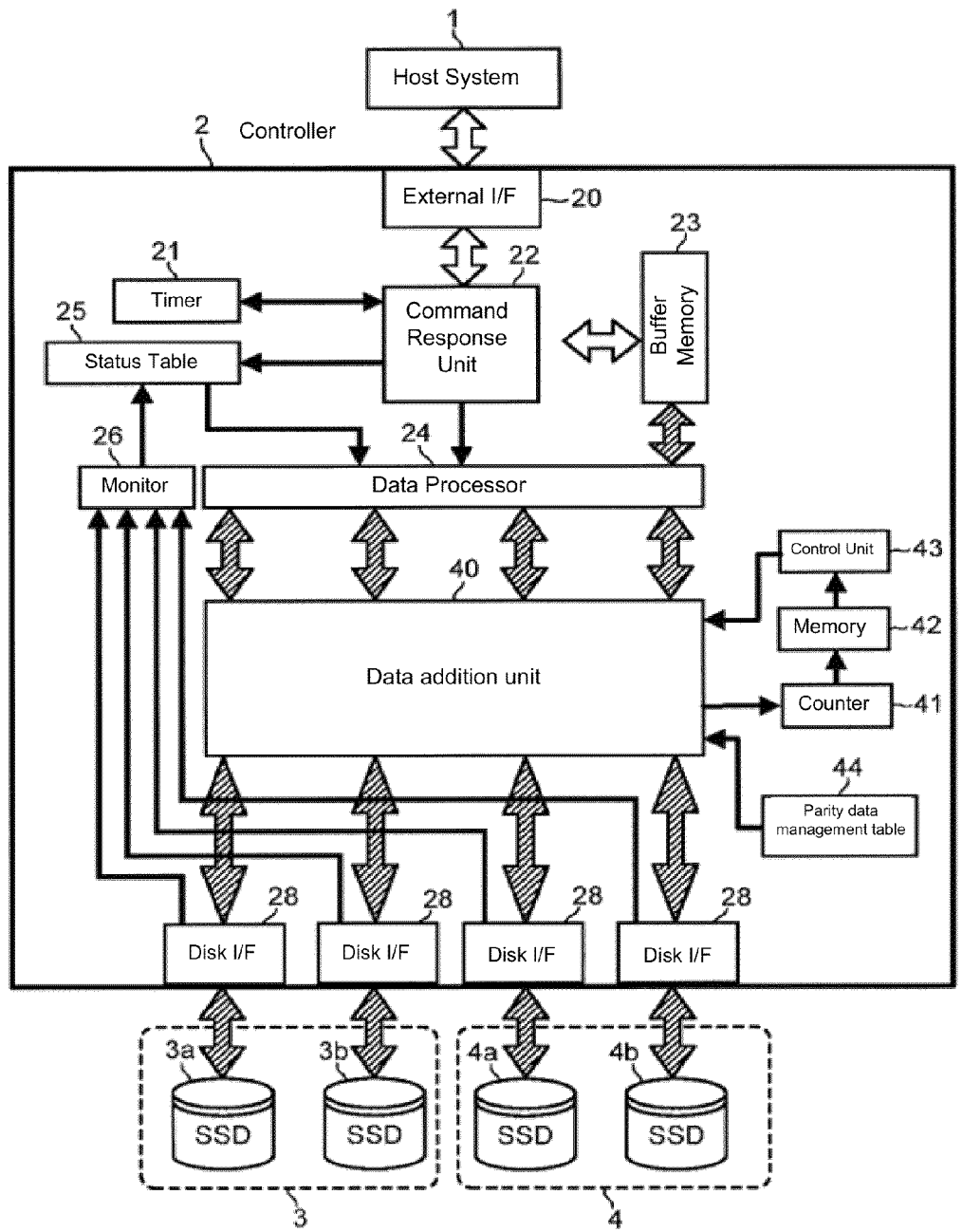
FIG. 9 is a figure showing the configuration of the control device of the fourth embodiment.

As shown in FIG. 9, the controller 2 of the fourth embodiment has the external I/F 20, the timer 21, the command response unit 22, the buffer memory 23, the data processor 24, the status table 25, the monitor 26, the disk I/F 28, the data processor 24, the data addition unit 40, units to control in which the SSD the parity data which this data addition unit 40 generates is written (the counter 41, the memory 42, the control unit 43, etc.), and the parity data management table 44.

Moreover, SSD 3a, SSD 3b, SSD 4a, and SSD 4b are connected to the disk I/F 28. The SSD 3a and the SSD 3b constitute the SSD group 1. The SSD 4a and the SSD 4b constitute the SSD group 2. The same data is written-in for every SSD group. Moreover, the divided data which are the data in which the data written in the SSD group was divided into the number of SSDs are written-in each SSD which constitutes a SSD group. Here, since one SSD group constitutes of two SSDs, the data written-in a SSD group is divided into two. Moreover, the data addition unit 40 generates parity data as redundant data of the divided data. The data addition unit 40 determines in which SSD the parity data is written, and sends the parity data to the SSD of a writing place through the disk I/F 28. That is, the data addition unit 40 divides data into two, writes one divided data in the first storage apparatus, writes the another divided data in the second storage, and writes the redundant data of those divided data in either of the two storage apparatus here. At this time, the data addition unit 40 determines in which storage apparatus parity data is written.

The counter 41 counts the total data volume of the parity data generated by the data addition unit 40.

As for the memory 42, non-volatility memories, such as a flash memory, are used, for example. This memory 42 stores the data volume of the parity data counted by the counter 41.

The memory 42 is configured that the maximum of the amount of writing of parity data or the conditions of a write-in ratio which were set up for every SSD group or every SSD in advance is stored.

This condition is configured to set up in advance that the write-in total amount or the write-in ratio of parity data written in each SSD may be different among all of the storages. The data addition unit 40 writes the parity data generated from two divided data according to this condition in the storage apparatus group.

Conditions for the write-in total amounts of parity data to differ are explained. If the conditions that write-in total amounts differ set to a, b, c, and d the total data volume of the parity data written in SSD 3a, and 3b, 4a and 4b, respectively, they will be a≠b≠c≠d.

This condition indicates the quantity of which is written for parity data in which SSD. Moreover, this condition is a threshold value which indicates the change timing of the maximum of the quantity of the parity data written in SSD 3a, and 3b, 4a and 4b, and the method of addition of parity data based on this maximum.

An example of the method of addition of the parity data set up as conditions is shown below. The data addition unit 40 writes parity data in either one of the storage apparatus which can be written-in among the first storage apparatus of a storage apparatus group, or the second storage apparatus of the storage apparatus group until the total data volume of the parity data written in SSD reaches a threshold value.

The data addition unit 40 does not write parity data in the SSD 3a of the SSD group 3. Whenever the data addition unit 40 writes in divided data, it writes parity data in the SSD 3b each time. That is, whenever it writes one data of two divided data in the SSD 3a and writes the data of another side in the SSD 3b, parity data is written in the SSD 3b. When the data addition unit 40 writes-in parity data to the SSD group 4, it writes the first parity data in the SSD 4a, writes the second parity data in the SSD 4b, and writes the third parity data in the SSD 4b. That is, one of the times where the writing place of parity data writes in parity data three times is the SSD 4a, and two of the times where the writing place of parity data writes in parity data three times are SSD 4b.

When the write-in total amount of parity data reaches a threshold value, the data addition unit 40 writes parity data in the SSD 3a and the SSD 3b by turns, after writing divided data in each SSD. In addition, also about the SSD group 4, the data addition unit 40 writes parity data in the SSD 4a and the SSD 4b by turns.

When the SSD group (for example, SSD group 4) of another side can be written in after writing data in the SSD group (for example, SSD group 3) which can be written in, the data of the buffer memory 23 is written in the SSD group 4 according to conditions.

The conditions from which the write-in ratio of parity data differs are explained. If the conditions that write-in ratios differ set the amount of writing of the parity data to the SSD 3a, the SSD 3b, the SSD 4a, and the SSD 4b to a, b, c, and d, respectively, they will be a:b≠c:d.

The control unit 43 sends the control signal which makes parity data add only to one SSD 3b to the data addition unit 40, when the total data volume of the parity data currently stored at the memory 42 does not reach the threshold value set up in advance for every SSD group or every SSD. When a total amount reaches a threshold value, the control unit 43 sends the control signal which makes parity data write-in two SSD 3a, 3b equally to the data addition unit 40.

That is, the control unit 43 controls the data addition unit 40 to change the SSD of the writing place which adds parity data according to the conditions of the write-in total amount set up for every SSD group or every SSD in advance, or a write-in ratio.

For example, when the total data volume of the counted parity data reaches the threshold value set up in advance, the control unit 43 controls the data addition unit 40 to write subsequent parity data in the SSD 3a and the SSD 3b by turns.

As shown in FIG. 10, the address translation data for changing the address of SSD into the parity data management table 44 according to the data size of the parity data added to every SSD 3a, 3b, 3c and 3d in each SSD group 3, 4 is stored. In this example, parity data is not added to SSD 3a at the beginning. Address translation is not performed, either. In this example, it is assumed that address translation of the parity data is added and carried out to the SSD 3b.

This parity data management table 44 stores the logical address (LBA (H)) which indicates the write-in position for every SSD and the size of writing data as information directed from the host system 1, and the logical address (LBA (C)) which indicates the write-in position for every SSD and the size of writing data is registered by the data addition unit 40 for every SSD as specification information after parity data addition.

In this case, the data addition unit 40 does not add parity data to the SSD 3a to the data from the host system 1. The data addition unit 40 generates the parity data Pab from the divided data a, b which divided the first write-in data D1 (refer to FIG. 12) from the host system 1 for the SSD 3b. After writing the parity data Pab in the SSD 3b, the data addition unit 40 writes the following data in the address shifted by the data size of the parity data Pab.

In addition, the logical address (LBA (C)) and data size after parity data addition are the value which added the data size of the parity data generated by the data addition unit 40 in advance to the specification information on the host system 1 (size of a logical address (LBA (H)) and data).

That is, this parity data management table 44 is an address mapping table for writing in the address for data writing specified from the host system including parity data.

The data addition unit 40 is arranged between the data processor 24 and the disk I/F 28. The data addition unit 40 divides the data D1 for writing into two divided data a, b, and if the storage apparatus group for writing is the SSD group 3, the data addition unit 40 writes the divided data a, b in the SSD group 3 by striping operation. The data addition unit 40 writes the parity data Pab generated from two more divided data a, b in the SSD of the writing place at which it was directed by the control unit 43.

For example, as a result of measuring with a threshold value the total data volume which wrote in parity data for every SSD, when the total data volume has not reached a threshold value, the data addition unit 40 makes the amount of occupancy of data produce a difference between SSDs by adding parity data only to one the SSD 3b of the SSD group 3.

Moreover, the total data volume which wrote in parity data for every SSD reaches a threshold value, and when the amount of data occupancy of the storage area of the SSD becomes to some extent uneven, the data addition unit 40 writes by turns the parity data written in the SSD group 3 in the SSD 3a and the SSD 3b. The amount difference of data occupancy between SSDs can be prevented from spreading more.

And when the SSD group 4 which is a storage apparatus group of another side can be written-in, the data addition unit 40 is written-in so that the conditions may be fulfilled in the SSD group 4 which is a storage apparatus group of another side about the data currently stored at the buffer memory 23.

If it explains in detail, the data addition unit 40 divides the data D1 for writing into two divided-data a and b. If the storage apparatus group for writing is the SSD group 3, the data addition unit 40 writes one divided-data a in the SSD 3a (the first storage apparatus). The data addition unit 40 writes divided-data b of another side in the SSD 3b (the second storage apparatus) of the SSD group 3. The data addition unit 40 writes the parity data Pab generated from two divided data a, b according to the conditions set up in advance in either one of the SSD 3a or the SSD 3b (this example the SSD 3b).

And if the SSD group 4 can be written-in, the data addition unit 40 divides into two divided-data a and b the writing data D1 which the r was buffered to the buffer memory 23. The data addition unit 40 writes one divided-data a in the SSD 4a (the first storage apparatus) of the SSD group 4 which is a storage apparatus group for writing. The data addition unit 40 writes divided-data b of another side in the SSD 4b (the second storage apparatus) of the SSD group 4. The data addition unit 40 writes the parity data Pab generated from two divided-data a and b according to the conditions set up in advance in either one of the SSD 4a or the SSD 4b (this example the SSD 4a).

However, since a use difference is produced by the SSD group 4 and the SSD group 3, the data addition unit 40 writes parity data in the SSD 4a of the SSD group 4 once, while writing parity data in the SSD group 4 three times, according to conditions. The data addition 40 writes parity data in the SSD 4b of the SSD group 4 twice, while writing parity data in the SSD group 4 three times.

Here, there are threshold values (for example, 1 G byte) of the total data volume of the parity data written in the SSD group in conditions. The data addition unit 40 changes the writing place of parity data by whether the total amount reached this threshold value. That is, parity data is written only in the SSD 3b until the total data volume which wrote parity data in the SSD group reaches a threshold value, after a total amount reaches a threshold value, the writing place of parity data is changed by turns like the SSD 3a, the SSD 3b, and the SSD 3a—, and these parity data is written in.

In this example, if the total amounts which added parity data are less than a threshold value (for example, 1 G byte etc.), the data addition unit 40 writes the following parity data in the SSD 3b based on that condition. When a total amount reaches a threshold value, the data addition unit 40 writes parity data in SSD 3a and SSD 3b by turns.

In the case of this fourth embodiment, the operation for a delay guarantee is the same as the first or the third embodiment. In addition, the fourth embodiment constitutes in the group SSD in which one data is written, in order to speed up writing and read-out of data by striping operation.

The group configuration of this fourth embodiment constitutes of two sets of the SSD 3a, and the SSD 3b in one SSD group 3, and the SSD group 4 of another side consists of two sets of the SSD 4a and the SSD 4b.

In this fourth embodiment, the data written in one SSD (this example the SSD 3b, 4b) of each SSD group 3, 4 is parity data as data with relation with mere not dummy data but other data.

That is, in this fourth embodiment, after dividing the data for writing, the writing to the SSD 3a of the SSD group 3 and 3b is speeding up by the striping. Moreover, by writing parity data in one SSD 3b, the amount of occupancy between the SSD 3a and 3b can be made to produce a difference, and, as a result, the reliability of data improves. Then, the divided data which divided the data buffered by the buffer memory 23 are written in the SSD group 4 which can be written in now at the SSD 4a, 4b, the amount of occupancy between the SSD 3a, 3b, 4a, and 4b is made to produce a difference by writing unevenly the parity data generated from these divided data in the SSD 4a and the SSD 4b.

Figure 11:
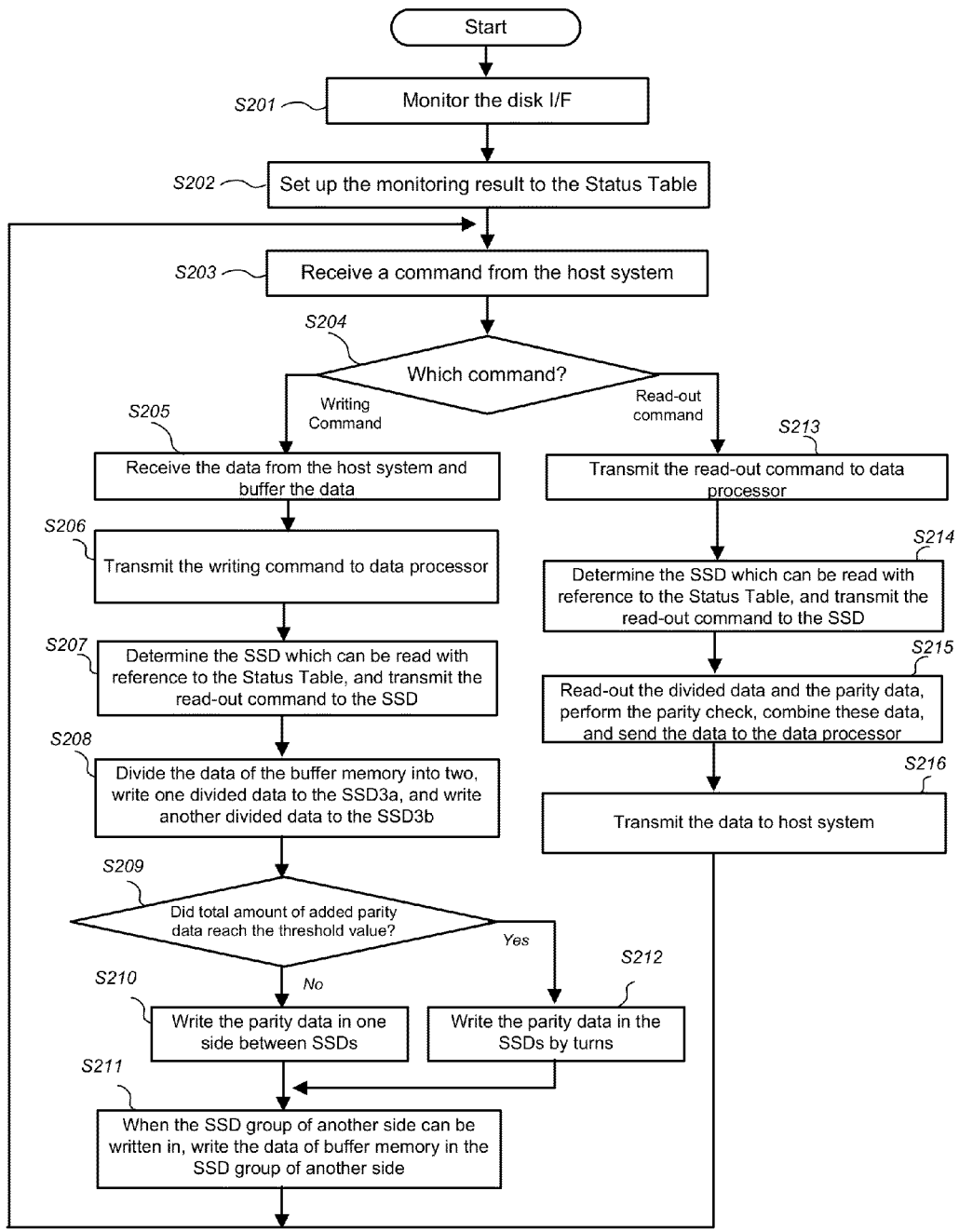
FIG. 11 is a flow chart showing operation of the control device of the fourth embodiment.

Hereafter, operation of this fourth embodiment is explained with reference to FIG. 11 and FIG. 12. At this fourth embodiment, it is the same as that of the first embodiment (flow chart of FIG. 3) about the following operations; the monitor 26 monitors the disk I/F 28, the data processor 24 which received the command from a host system determines the SSD for processing, a write-in command or a read-out command is sent to the data addition unit 40. Here, operation after it is explained.

If the data addition unit 40 is written in from the data processor 24 and the target data (for example, data D1 indicated in FIG. 12) is received, it divides the received data D1 into two divided-data a and b. The data addition unit 40 writes one divided-data a in the SSD 3a among two divided divided-data a and b. The data addition unit 40 writes divided-data b of another side in the SSD 3b (Step S208 of FIG. 11).

Then, the data addition unit 40 generates parity data from two divided-data a and b. The data addition unit 40 writes the generated parity data in the SSD of the writing place specified by the control unit 43.

At this time, the counter 41 counts the data volume of the parity data generated by the data addition unit 40, and stores the data volume in the memory 42.

The control unit 43 determines if the total data volume of the written-in parity data which is stored at the memory 42 whenever the data volume of the memory 42 is updated reached the threshold value S (Step S209). The control unit 43 controls a writing place to the data addition unit 40 according to the result.

For example, when the total data volume of the written-in parity data has not reached the threshold value S (No of Step S209), the control unit 43 controls the data addition unit 40 to write parity data only in the SSD 3b.

By this control, the data addition unit 40 writes the parity data generated from divided data a, b only in one SSD 3b (Step S210).

And the command response unit 22 is if the SSD group 4 can be written in with reference to the status table 25 as a result, The data addition unit 40 writes in data which is buffered by the buffer memory 23 for writing and parity data generated from the data for the writing through disk I/F 28 the target SSD group 4 (step S211).

Figure 12:
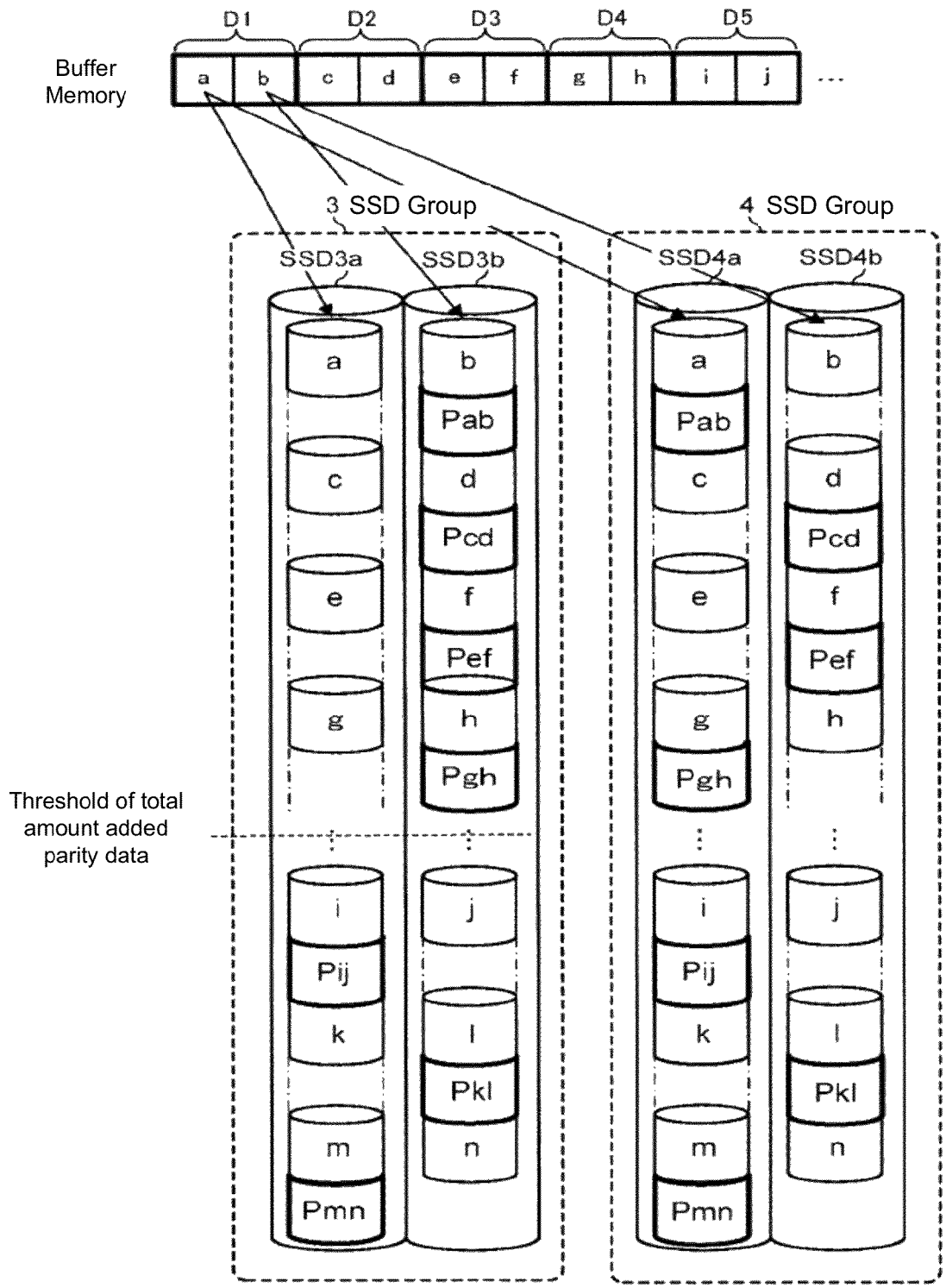
FIG. 12 is a figure for explaining operation of the control device of the fourth embodiment.

When writing data in each SSD 4a, 4b of the SSD group 4, as shown in FIG. 12, parity data is written only once in three times in which the SSD 4a of the SSD group 4 writes parity data. The parity data is written only twice in three times in which the SSD 4b of the SSD group 4 writes parity data. As a result, the amount difference of data occupancy between each SSD 4a, 4b can be made uneven.

This makes it possible to make uneven the amount difference of data occupancy of the storage area of the SSD groups 3, 4 and every SSD 3a to 4b.

Moreover, when the writing of the data to a SSD group progresses, for example, the data D5 of FIG. 12 is written in, if the total amount of the parity data to write in has reached the threshold value S (Yes of Step S209), the control unit 43 controls the data addition unit 40 to write the parity data to write in the SSD 3a and the SSD 3b by turns.

By this control, if the data for writing is the data D5, the data addition unit 40, the parity data Pij generated from the divided data i, j is written in the SSD 3a, and the parity data Pmn of the following data D6 is written in the SSD 3b (Step S212).

In other words, 1 GByte is set as the upper limit of parity data writing, and the threshold value S in advance among the SSD groups 3, 4 to the SSD with most number of times of parity data writing, for example, the SSD 3b, The control unit 43 compares the total data volume and the threshold value S of parity data which were counted, when a count value exceeds the threshold value S of for example, 1 GByte, the data addition unit 40 controls to make parity data write in the SSD 3a and the SSD 3b by turns.

In addition, about the read-out processing of data to the read-out command of step S213 to S216, the dummy data explained by the first embodiment (flow chart of FIG. 3) is changed into parity data, and change and SSD are changed into a SSD group.

In this fourth embodiment, since processing of Step S215 differs from the first embodiment, that processing is explained.

In the case of processing of Step S215, the data addition unit 40 reads the divided data of data and parity data for read-out from two SSDs of the SSD group which data can read, the data addition unit 40 combines two divided data with one data, and passes them to the data processor 24 after performing the parity check of divided data.

Thereby, between the SSDs 3a, 3b (and between the SSD 4a and 4b), if the difference of a certain fixed amount of data occupancy arises, a difference do not spread any more. As a result, it can prevent only SSD 3b, 4b of one side of each SSD group 3, 4 reaching a life early extremely.

Thus, according to this fourth embodiment, four sets of SSDs 3a, 3b, 4a, 4b are used. The SSD 3a, 3b constitutes the SD group 3 (first storage apparatus group), the SSD group 4 (second storage apparatus group) for guaranteeing response time is constituted. And one SSD group of the two SSD groups 3, 4 is maintained at the state in which data read-out is always possible, while a striping using every SSD 3a, 3b of the SSD group 3 is performed. It is simultaneously realizable of not only making uneven of the life of each SSD 3a, 3b, 4a and 4b but improvement in the speed of the write-in time of data, and the guarantee of response time.

As a result, making uneven of the life of each SSD and improvement in the speed by the striping of data writing and read-out are simultaneously realizable, offering the guarantee of response time.

Moreover, you may realize each component shown in the embodiment by the program installed in storage, such as a hard disk drive of a computer. Moreover, the program is memorized to electronic media in which computer reading is possible, and a computer may be made to realize the function of the present invention by making a computer read a program in electronic media. As electronic media, recording media, such as CD-ROM, flash memory and removable media and the like are included, for example. Furthermore, a component may be distributed and stored in a different computer connected through the network, and you may realize by communicating between the computers as which each component was operated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A controller having interfaces connectable to a host system, a first storage apparatus, and a second storage apparatus, wherein data in the first storage apparatus and data in the second storage apparatus are duplicates, the controller comprising:
a status table configured to store an operating state for the first storage apparatus and the second storage apparatus, wherein the operating state includes writing, reading, or standing by;
a monitor configured to monitor the interfaces and set up the status table;
a buffer memory configured to buffer data to be written in the first storage apparatus and the second storage apparatus;
a command unit configured to
receive a data for writing in and a request for writing the data from the host system,
buffer the writing data in the buffer memory, and
generate a control signal for writing the data in the first storage apparatus and the second storage apparatus;
a data processor configured to send the buffered data to one of the first storage apparatus and the second storage apparatus with an operating status in the status table according to the control signal for writing the data from the command unit, the one of the first storage apparatus and the second storage apparatus being available for writing the data; and
an adder arranged between the data processor and either interface connected to the first storage apparatus or the second storage apparatus, configured to add dummy data to the data to be sent to the first storage apparatus or the second storage apparatus, and write the data and the added dummy data to the one of the first storage apparatus and the second storage apparatus.

2. The controller of claim 1, wherein,
the adder removes the dummy data from a data read from the first storage apparatus or the second storage apparatus with reference to the status table, based on a control signal for reading the data from the host system, to output a dummy less data having no dummy data to the data processor.

3. The controller of claim 2, further comprising,
a counting memory;
a dummy data counter configured to count a data amount of the added dummy data, and store the data amount on the counting memory; and
a control unit configured to make the adder stop adding the dummy data when the data amount of the added dummy data stored on the counting memory reaches a threshold value set in advance.

4. The controller of claim 1, further comprising,
a counting memory;

a dummy data counter configured to count a data amount of the added dummy data, and store the data amount on the counting memory; and a control unit configured to make the adder stop adding the dummy data when the data amount of the added dummy data stored on the counting memory reaches a threshold value set in advance.

5. A controller having interfaces connectable to a host system and a plurality of storage apparatuses, wherein a data in the plurality of apparatus are duplicates, the controller comprising:

a status table configured to store an operating state for the plurality of storage apparatuses, wherein the operating state includes writing, reading, or standing by;

a monitor configured to monitor the interfaces and set up the status table;

a buffer memory configured to buffer data to be written in the plurality of storage apparatuses;

a command unit configured to receive a data for writing in and a request for writing the data from the host system, buffer the writing data in the buffer memory, and generate a control signal for writing the data in the plurality storage apparatuses;

a data processor configured to send the buffered data to one of the plurality of storage apparatuses with an operating status in the status table according to the control signal for writing the data from the command unit, the one of the plurality of storage apparatuses being available for writing the data;

a dummy data management table configured to be set dummy data amount of dummy data added to the writing data for each of the plurality of storage apparatuses; and an adder arranged between the data processor and among interfaces connected to the plurality of storage apparatuses, configured to add the dummy data to the data to be sent to each of the storage apparatuses, and write the added dummy data and the data to each of the storage apparatus.

6. The controller of claim 5, wherein, the adder removes the dummy data from a data read from each of the storage apparatuses, based on a control signal for reading the data from the host system, to output a dummy less data having no dummy data to the data processor.

7. The controller of claim 6, further comprising, a counting memory;

a dummy data counter configured to count a data amount of the added dummy data, and store the data amount on the counting memory; and a control unit configured to make the adder stop adding the dummy data when the data amount of the added dummy data stored on the memory reaches a threshold value set in advance.

8. The controller of claim 5, further comprising, a counting memory;

a dummy data counter configured to count a data amount of the added dummy data, and store the data amount on the counting memory; and a control unit configured to make the adder stop adding the dummy data when the data amount of the added dummy data stored on the memory reaches a threshold value set in advance.

9. A method for controlling a first storage apparatus and a second storage apparatus with interfaces connectable to a host system, wherein a data in the first storage apparatus and a data in the second storage apparatus are duplicates, the method comprising:

monitoring the interfaces for operating states of the first and second storage apparatuses;

setting a status table with the monitored operating states of the first and second storage apparatuses, the operating states including writing, reading, or standing by;

receiving a writing command and a data to be written from the host system, buffering the data from the host system in a buffer memory;

transmitting the buffered data to one of the first storage apparatuses and the second storage apparatus in accordance with the status table and the writing command;

adding dummy data to the data sent to the one of the first storage apparatus and the second storage apparatus; and writing the dummy data and the data in the one of the first storage apparatus and the second storage apparatus.

10. A controller having interfaces connectable to a host system, a first storage group including a plurality of storage apparatuses, and a second storage group including a plurality of storage apparatuses, wherein a data in the first storage group and a data in the second storage group are duplicates, the controller comprising, a status table configured to store operating states of the first and second storage groups, wherein the operating states include writing, reading, or standing by;

a monitor configured to monitor the interfaces for the operating states and set up the status table;

a buffer memory configured to buffer data to be written in the first and second storage groups;

a command response unit configured to receive a data for writing in and a request for writing the data from the host system, buffer the writing data in the buffer memory, and generate a control signal for writing the data in the first and second storage groups;

a data processor configured to send the buffered data to one of the first and second storage groups with an operating status in the status table according to the control signal for writing the data from the command response unit, the one of the first and second storage groups being available for writing the data;

an adder configured to:

divide the data into a first divided data and a second divided data, write the first divided data in a first storage device of the first storage group, write the second divided data in a second storage device of the first storage group, and write a redundant data generated from the first divided data and the second divided data to the first storage apparatus in the first group, the second storage apparatus in the first group, a first storage apparatus in the second storage group, or a second storage apparatus in the second group.

11. The controller of claim 10, wherein, if the first storage group and the second storage group include a first storage apparatus and a second storage apparatus respectively, the adder writes the redundant data in one of the storage apparatuses according to a predetermined condition.

12. The controller of claim 11, wherein, after the data processor writes the buffered data in one of either the first storage group or the second storage group, if the other storage group can be written, the data processor writes the buffered data to the other storage group according to the predetermined condition.

13. The controller of claim 10, wherein,
if the first storage group and the second storage group include a first storage apparatus and a second storage apparatus respectively, the adder writes the redundant data three times in one of the storage apparatus in the first storage group,
the redundant data is written once in three times in which one of the storage apparatus in the second storage group, and is written twice in three times in which the other storage apparatus in the second storage group.

14. The controller of claim 13, wherein, after the data processor writes the buffered data in one of either the first storage group or the second storage group, if the other storage group can be written, the data processor write the buffered data the other storage group according to the predetermined condition.

15. The controller of claim 10, further comprising,
a counting memory;
a dummy data counter configured to count a data amount of the added dummy data, and store the data amount on the counting memory; and
a control unit configured to control the adder in order to write the redundant data to all of the storage apparatus by turns.

16. The controller of claim 10 wherein the redundant data is written to the first storage apparatus in the first group, the second storage apparatus in the first group, a first storage apparatus in the second storage group, or a second storage apparatus in the second group according to whether a write-in total amount or a write-in ratio of redundant data written in each storage apparatus is uneven among all of the storage apparatuses.

17. A method for controlling a storage apparatus having interfaces, the interfaces being connectable to a host system, a first storage group including first and second storage apparatuses, and a second storage group including first and second storage apparatuses, wherein a data in the first storage group and a data in the second storage group are duplicates, the method comprising,
monitoring the interfaces for operating states of the first storage group and the second storage group;
setting a status table with the operating states, said states including writing, reading, or standing by;
receiving a writing command and a data to be written from the host system,
buffering the data from the host system in a buffer memory,
transmitting the buffered data to one of the first and second storage groups with reference to the status table according to the writing command, the one of the first and second storage groups being available for writing the data in accordance with the operating state;
writing redundant data three times in one of the storage apparatuses in the first storage group,
writing redundant data once in three times in which one of the storage apparatuses in the second storage group writes redundant data; and
writing the redundant data twice in three times in which the other storage apparatus in the second storage group writes redundant data.

* * * * *